United States Patent
Moon et al.

(10) Patent No.: US 9,278,657 B2
(45) Date of Patent: Mar. 8, 2016

(54) EXTERIOR PANEL FOR VEHICLE HAVING STRUCTURE FOR PREVENTING WATER FROM REMAINING

(71) Applicant: Kia Motors Corporation, Seoul (KR)

(72) Inventors: Chan Joo Moon, Hwaseong-Si (KR); Nam Cheol Kim, Suwon-Si (KR); Sang Soo Lee, Seoul (KR); Jeong Ho Lee, Suwon-Si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 14/561,149

(22) Filed: Dec. 4, 2014

(65) Prior Publication Data

US 2015/0329067 A1  Nov. 19, 2015

(30) Foreign Application Priority Data

May 15, 2014 (KR) ........................ 10-2014-0058119

(51) Int. Cl.
*B60R 13/07* (2006.01)
*B60R 13/04* (2006.01)

(52) U.S. Cl.
CPC .............. *B60R 13/07* (2013.01); *B60R 13/04* (2013.01)

(58) Field of Classification Search
CPC ....... B60J 5/0418; B60J 5/0444; B60R 13/07; B60R 13/04
USPC .................................... 296/91, 154
See application file for complete search history.

(56) References Cited

U.S. PATENT DOCUMENTS

| | | | | |
|---|---|---|---|---|
| 3,059,562 A * | 10/1962 | Sturtevant | ............... | B60H 1/248 296/154 |
| 3,938,856 A * | 2/1976 | Janssen | ................ | B60J 10/0045 296/154 |
| 4,445,721 A * | 5/1984 | Yaotani | ................ | B60J 5/0418 296/154 |
| 4,962,601 A * | 10/1990 | Gold | ..................... | B60J 10/0045 296/154 |
| 5,482,343 A * | 1/1996 | Bradac | ................... | B60J 5/0418 296/146.7 |
| 6,468,149 B2 * | 10/2002 | Essig | ....................... | B60J 7/106 454/115 |
| 7,066,527 B2 * | 6/2006 | Kohara | ................. | B60J 5/0418 296/146.7 |
| 8,172,307 B2 * | 5/2012 | Froeschle | .............. | B60J 1/2008 180/903 |
| 8,454,083 B2 * | 6/2013 | Dimitriou | .............. | B62D 35/00 296/193.06 |
| 8,720,977 B2 * | 5/2014 | Nakamura | ............. | B60J 5/0405 296/146.2 |
| 2002/0008405 A1 * | 1/2002 | Yee | ......................... | B60J 5/0418 296/154 |
| 2008/0284202 A1 * | 11/2008 | Filipczak | ............... | B60J 5/0418 296/146.1 |
| 2009/0322118 A1 * | 12/2009 | Koa | ........................ | B60J 5/0418 296/146.7 |
| 2010/0237652 A1 * | 9/2010 | Grammer | ................ | B60R 13/07 296/154 |
| 2014/0175815 A1 * | 6/2014 | Kim | ......................... | B60R 19/52 293/115 |

FOREIGN PATENT DOCUMENTS

| | | |
|---|---|---|
| DE | 10 2010 013 074 A1 | 9/2011 |
| JP | 5-193422 A | 8/1993 |
| JP | 10-016847 | 1/1998 |

(Continued)

*Primary Examiner* — Pinel Romain
(74) *Attorney, Agent, or Firm* — Morgan, Lewis & Bockius LLP

(57) ABSTRACT

An exterior panel for a vehicle having a structure for preventing water from remaining therein, may include reinforcing ribs having a shape inclined downward, integrally formed on an inner surface of the panel, and disposed in a staggered arrangement at left and right sides of the panel, such that zigzag-shaped water drain routes, which guide water flowing into the panel in a downward direction, are formed on the inner surface of the panel, wherein lower end portions of the reinforcing ribs are adjacent to each other in upward and downward directions.

8 Claims, 3 Drawing Sheets

(56) References Cited

FOREIGN PATENT DOCUMENTS

| JP | 2004-096968 | | 3/2004 |
|---|---|---|---|
| JP | 2009-051328 | A | 3/2009 |
| JP | 2011-195113 | | 10/2011 |
| JP | 2014-69609 | A | 4/2014 |

* cited by examiner

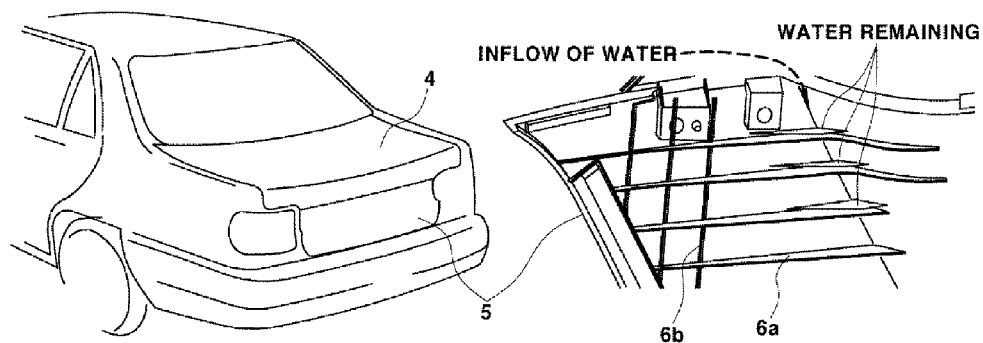
FIG. 1
FIG. 1(Related Art)
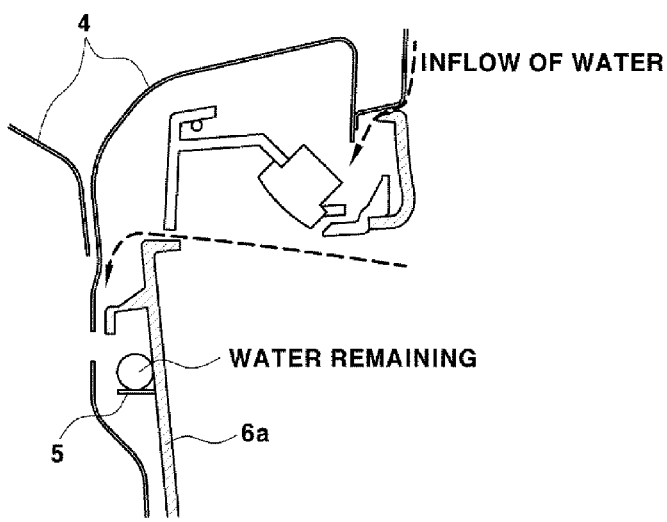
FIG. 2 (Related Art)

EXTERIOR PANEL FOR VEHICLE HAVING STRUCTURE FOR PREVENTING WATER FROM REMAINING

CROSS-REFERENCE TO RELATED APPLICATION

The present application claims priority to Korean Patent Application No. 10-2014-0058119 filed May 15, 2014, the entire contents of which is incorporated herein for all purposes by this reference.

BACKGROUND OF THE INVENTION

1. Field of the Invention

The present disclosure relates to an exterior panel for a vehicle. More particularly, it relates to an exterior panel for a vehicle having a structure for preventing water from remaining.

2. Description of Related Art

A vehicle body of a vehicle is configured by assembling numerous panels, and particularly, an exterior panel is formed in consideration of design characteristics because the exterior panel defines an external appearance of the vehicle.

In addition, the vehicle body panel needs to have sufficient rigidity so as to withstand impact or loads, and the exterior panel needs to have not only a suitable design but also a suitable water drain structure so as to smoothly discharge water when it is rainy or when the vehicle is washed.

For example, a separate plastic injection-molded panel, which is an exterior panel for an external appearance, that is, a back panel molding member (also called a tail gate or a garnish of a trunk lid) is mounted to a rear outside of a tail gate panel or the trunk lid of the vehicle so as to finish the rear outside, and thus the back panel molding member also needs to have sufficient rigidity and a suitable water drain structure.

FIG. 1 is a view illustrating a portion of the vehicle to which the back panel molding member is applied, and FIG. 2 is a view for explaining a problem in the related art.

As illustrated at the right side drawing of FIG. 1, reinforcing ribs 6a and 6b are formed on an inner surface of a back panel molding member 5 that is mounted at a rear side of a trunk lid 4, and in this case, the reinforcing ribs 6a and 6b are formed as grid-shaped ribs in which ribs, which are elongated horizontally and vertically, are connected to each other in order to enhance an effect of reinforcing rigidity.

In addition, because the back panel molding member 5 is an exterior panel installed outside the vehicle body, water may flow into a gap formed due to an assembly tolerance created between respective components, or a gap that is set to prevent abnormal noise, and as a result, it is necessary to provide a structure for discharging water flowing into the vehicle.

However, there is a problem in that water, which flows into gaps (intervals) between components when it is rainy or when the vehicle is washed in a state in which the tail gate or the trunk lid 4 is closed, remains on the reinforcing ribs 6a of the back panel molding member 5, and thereafter, the water remaining inside the tail gate or the trunk lid 4 is directly poured to the outside when the tail gate or the trunk lid 4 is opened and tilted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exterior panel for a vehicle which prevents water from remaining inside a vehicle, allows water to be smoothly discharged, and guides and discharges water flowing into the vehicle to a specific position where a user is not inconvenienced.

According to various aspects of the present invention, an exterior panel for a vehicle having a structure for preventing water from remaining therein, may include reinforcing ribs having a shape inclined downward, integrally formed on an inner surface of the panel, and disposed in a staggered arrangement at left and right sides of the panel, such that zigzag-shaped water drain routes, which guide water flowing into the panel in a downward direction, are formed on the inner surface of the panel, wherein lower end portions of the reinforcing ribs are adjacent to each other in upward and downward directions.

A plurality of sub ribs, disposed at predetermined intervals, may be extended and elongated downward from a lower side of each of the reinforcing ribs.

A water drain pad portion, protruding from an inner surface of the panel and elongated in a shape inclined downward, guides the water, which flows into the inner surface, in the downward direction.

The water drain pad portion may be formed to have a shape that is inclined downward from a center of the panel in left and right directions toward both left and right sides of the panel.

Positions of water discharge ports, which are set by a portion of the reinforcing ribs that are positioned at a lowermost end of the panel, may be set to both left and right sides of the panel at the lowermost end of the panel.

The panel may be mounted to a rear side of the vehicle.

According to various aspects of the present invention, an exterior panel for a vehicle having a structure for preventing water from remaining therein, the exterior panel may include reinforcing ribs having a shape inclined downward, integrally formed on an inner surface of the external panel, and disposed in a staggered arrangement at left and right sides of the external panel, such that water flows into the external panel in a downward direction along zigzag-shaped water drain routes formed on the inner surface of the external panel, wherein lower end portions of the reinforcing ribs are adjacent to each other in upward and downward directions, a plurality of sub ribs, disposed at predetermined intervals, are extended and elongated downward from a lower side of each of the reinforcing ribs, a water drain pad portion, protruding from an inner surface of the external panel and elongated in a shape inclined downward, and guiding the water, which flows into the inner surface of the external panel, in the downward direction, in which the water drain pad portion is formed to have a shape that is inclined downward from a center of the external panel in left and right directions toward both left and right sides of the external panel, and positions of water discharge ports, which are set by a portion of the reinforcing ribs that are positioned at a lowermost end of the external panel, are set to both left and right sides of the external panel at the lowermost end of the external panel.

Therefore, according to the exterior panel for a vehicle of the present invention, there are advantages in that sufficient rigidity may be assured, water flowing into the vehicle may be prevented from remaining inside the vehicle and may be smoothly discharged, and water flowing into the vehicle may be guided and discharged to a specific position where a user is not inconvenienced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view illustrating a portion of a vehicle to which an external panel is applied in the related art.

FIG. 2 is a view for explaining a problem in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides an exterior panel for a vehicle which prevents water from remaining inside a vehicle, allows water to be smoothly discharged, and guides and discharges water flowing into the vehicle to a specific position where a user is not inconvenienced.

The exterior panel 10 of the present invention may be a panel, which is manufactured by plastic injection molding so as to be attached to a rear outside of a tail gate panel or a trunk lid of a vehicle, that is, a back panel molding member (also called a tail gate or a garnish of the trunk lid), and the external panel 10 will be described as an example in the following description.

Figure 3:
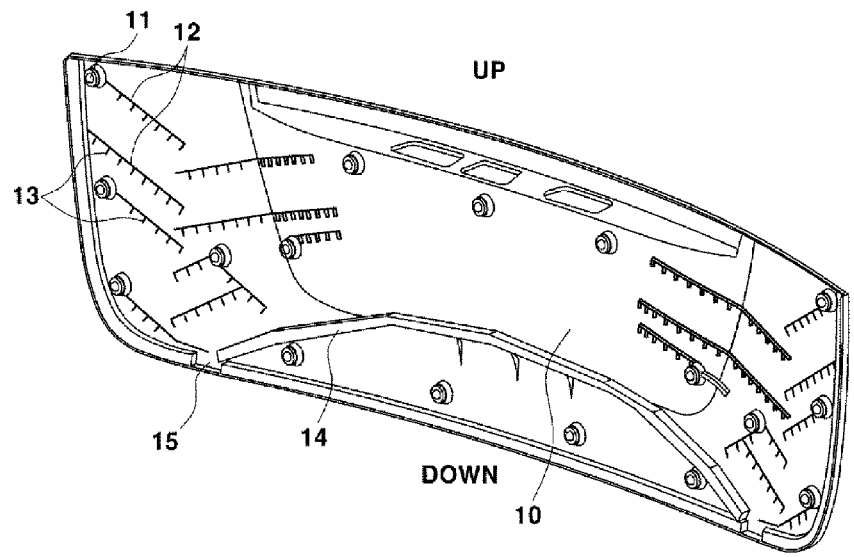
FIG. 3 is a perspective view illustrating an external panel in the exemplary exterior panel according to the present invention.
Figure 4:
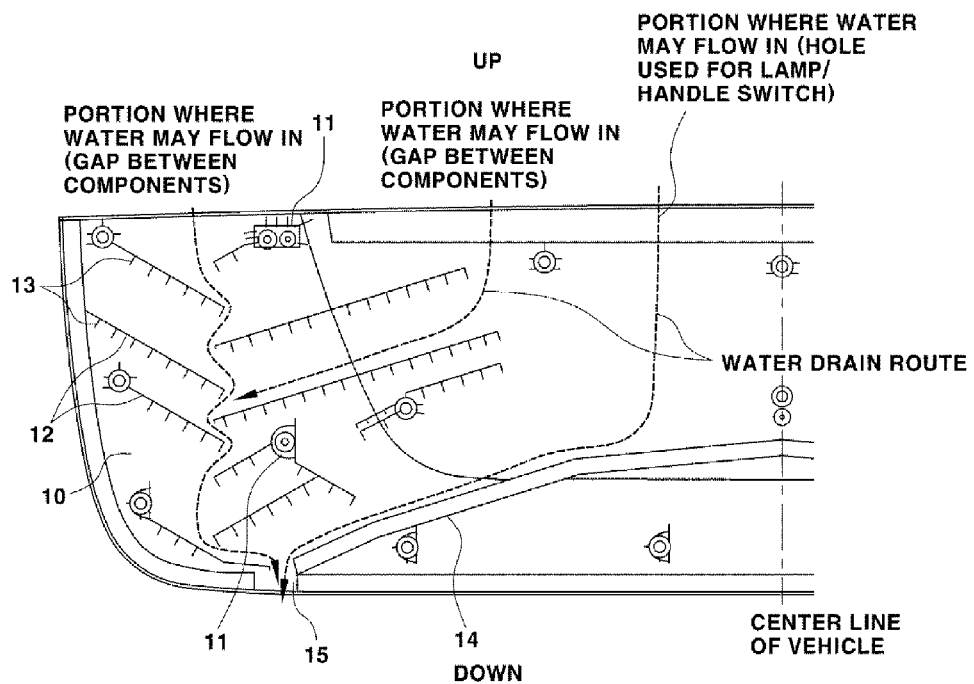
FIG. 4 is a front view for explaining a main configuration of the external panel illustrated in FIG. 3 and a water drain route in the exemplary exterior panel according to the present invention.

FIG. 3 is a perspective view illustrating the external panel 10 according to various embodiments of the present invention, and FIG. 4 is a front view for explaining a main configuration of the external panel 10 illustrated in FIG. 3 and a water drain route.

As illustrated, a plurality of mounting portions 11 (also called a doghouse) to which an insert bolt, a clip, or the like for coupling the tail gate panel or the trunk lid is assembled is installed on an inner surface of an external panel 10.

In addition, a plurality of reinforcing ribs 12 is formed on the inner surface of the external panel 10, and the reinforcing ribs 12 are provided to reinforce rigidity of the external panel 10 (to prevent a rigidity reinforcing member of the external panel 10 from being bent), and each of the reinforcing ribs 12 is elongated in one direction.

In this case, some of the entire reinforcing ribs 12 are extended to be elongated from the mounting portion 11, and a plurality of sub ribs 13, which are disposed at predetermined intervals, are extended to be elongated downward from each of the reinforcing ribs 12.

Referring to FIGS. 3 and 4, upward and downward directions refer to upward and downward directions of the external panel 10 when the external panel 10 is actually mounted to the vehicle, and a lower portion of the external panel 10 is a portion which is positioned to the ground surface when the external panel 10 is mounted to the vehicle.

A center line of the vehicle indicates a center line of the external panel 10, and the reinforcing ribs 12, the sub ribs 13, and a water drain pad portion 14, which will be described below, are horizontally symmetric about the center line of the vehicle.

A number plate of the vehicle may be attached to an outer surface of the external panel 10 in the vicinity of the center line of the vehicle.

When describing a shape in which the reinforcing ribs 12 are disposed, each of the reinforcing ribs 12 is formed to be elongated to have a shape inclined downward as illustrated in FIGS. 3 and 4, and has a shape that is inclined downward from one end portion to the other end portion opposite to the one end portion, that is, a shape that is inclined toward the ground surface when the external panel is actually mounted to the vehicle.

Meanwhile, the reinforcing ribs 12, which are adjacent to each other in the upward and downward directions, are disposed at the right and left sides, respectively, of the external panel 10 and lower end portions of the reinforcing ribs 12 are formed to be staggered without being connected to each other. The reinforcing ribs 12, which are adjacent to each other in the upward and downward directions, are disposed to overlap each other in a zigzag shape, and water drain routes (indicated by dashed arrows in FIG. 4) having a zigzag shape are formed by the staggered structure of the lower end portions.

In addition, positions of the water discharge ports 15, which are set by the reinforcing ribs 12 that are positioned at the lowest side, are set to both left and right sides at a lowermost end of the external panel 10, and therefore, terminal ends of the water drain routes are positioned at the left and right sides at the lowermost end of the external panel 10.

That is, water, which flows into the external panel 10 through gaps between components, flows through the zigzag-shaped water drain routes formed by the reinforcing ribs 12, and is discharged to the outside through the water discharge ports 15 positioned at both left and right sides at the lowermost end of the external panel 10.

In addition, the water drain pad portion 14, which is extended to be elongated from a center of the external panel 10 to both the left and right sides, is provided on the inner surface of the external panel 10, and the water drain pad portion 14 protrudes on the inner surface of the external panel 10 so as to have a shape that is inclined downward toward the left and right sides.

The water drain pad portion 14 forms a water drain route for discharging water that flows in from portions other than the water drain routes formed by the reinforcing ribs 12, and water, which flows in through gaps such as a hole used for a lamp or a handle switch, flows onto the water drain pad portion 14, and then is guided downward to the left and right sides along the water drain pad portion 14, and discharged through the water discharge ports 15 positioned at the left and right sides of the back panel molding member.

As described above, in the present invention, the inclined reinforcing ribs 12 and the water drain pad portion 14 are formed, and as a result, water, which flows into the external panel 10 through gaps or holes between components, is guided downward along the water drain routes (water guiding routes) formed by the reinforcing ribs 12 and the water drain pad portion 14, and discharged through the water discharge ports 15 positioned at both left and right sides at the lowermost end of the external panel 10.

In consideration of a situation in which a typical user mainly stands at a center line position of the vehicle during an operation of opening the tail gate or the trunk lid by manipulating the handle switch or lifting up the tail gate or the trunk lid under a general condition, the water drain routes, which may guide and discharge water to the specific positions at both left and right sides as described above, may be set.

In addition, in a case in which the lower end portions of the reinforcing ribs 12 are disposed in a staggered arrangement such that the zigzag-shaped water drain routes are formed, sufficient rigidity of the external panel 10 may be assured, and excellent water drain characteristics, which may allow water to be smoothly discharged, may be assured.

Figure 5:
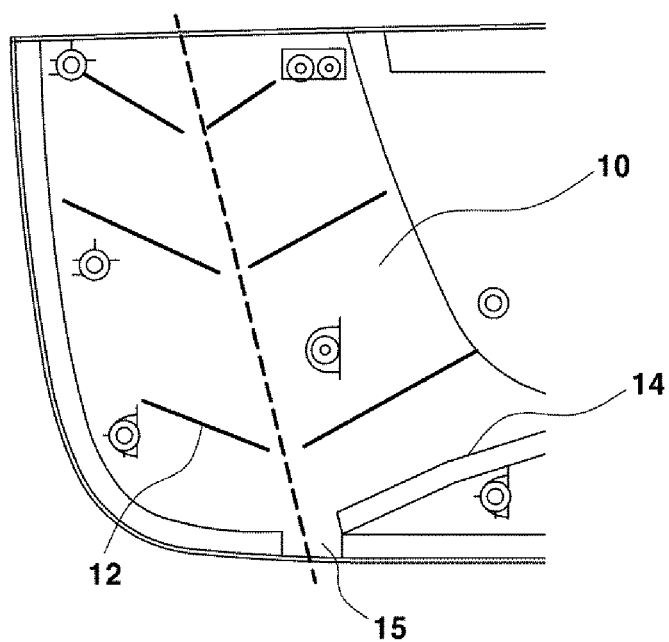
FIG. 5 is a view of a Comparative Example, which shows an example in which lower end portions of reinforcing ribs are not staggered in the exemplary exterior panel according to the present invention.

FIG. 5 is a view of a Comparative Example, which shows an example in which the lower end portions of reinforcing ribs 12 are not staggered. In this case, the water drain route is rectilinearly formed so as to improve water drain characteristics, but a portion vulnerable in terms of rigidity reinforcement is also rectilinearly formed (as indicated by a dotted line in FIG. 5), and as a result, the external panel 10 may be easily deformed and damaged.

However, as illustrated in FIG. 4, in a case in which the lower end portions of the inclined reinforcing ribs 12 overlap each other so as to form the zigzag-shaped water drain routes, sufficient water drain characteristics may be assured, and the portion vulnerable in terms of rigidity reinforcement may be reinforced by the reinforcing structure, thereby allowing rigidity of the external panel 10 to be excellent.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exterior panel for a vehicle having a structure for preventing water from remaining therein, including:
    reinforcing ribs having a shape inclined downward, integrally formed on an inner surface of the panel, and disposed in a staggered arrangement at left and right sides of the panel, such that zigzag-shaped water drain routes, which guide water flowing into the panel in a downward direction, are formed on the inner surface of the panel,
    wherein lower end portions of the reinforcing ribs are adjacent to each other in upward and downward directions.

2. The exterior panel of claim 1, wherein a plurality of sub ribs, disposed at predetermined intervals, are extended and elongated downward from a lower side of each of the reinforcing ribs.

3. The exterior panel of claim 1, wherein a water drain pad portion, protruding from an inner surface of the panel and elongated in a shape inclined downward, guides the water, which flows into the inner surface of the panel, in the downward direction.

4. The exterior panel of claim 3, wherein the water drain pad portion has a shape that is inclined downward from a center of the panel in left and right directions toward both left and right sides of the panel.

5. The exterior panel of claim 1, wherein positions of water discharge ports, which are set by a portion of the reinforcing ribs that are positioned at a lowermost end of the panel, are set to both left and right sides of the panel at the lowermost end of the panel.

6. The exterior panel of claim 1, wherein the external panel is mounted to a rear side of a tail gate or a trunk lid of the vehicle.

7. The exterior panel of claim 4, wherein positions of water discharge ports, which are set by the reinforcing ribs that are positioned at a lowermost end of the panel, are set to both left and right sides of the panel at the lowermost end of the panel.

8. An exterior panel for a vehicle having a structure for preventing water from remaining therein, including:
    reinforcing ribs having a shape inclined downward, integrally formed on an inner surface of the external panel, and disposed in a staggered arrangement at left and right sides of the external panel, such that water flows into the external panel in a downward direction along zigzag-shaped water drain routes formed on the inner surface of the external panel, wherein lower end portions of the reinforcing ribs are adjacent to each other in upward and downward directions;
    a plurality of sub ribs, disposed at predetermined intervals, are extended and elongated downward from a lower side of each of the reinforcing ribs; and
    a water drain pad portion, protruding from an inner surface of the external panel and elongated in a shape inclined downward, and guiding the water, which flows into the inner surface of the external panel, in the downward direction,
    wherein the water drain pad portion is formed to have a shape that is inclined downward from a center of the external panel in left and right directions toward both left and right sides of the external panel, and
wherein positions of water discharge ports, which are set by a portion of the reinforcing ribs that are positioned at a lowermost end of the external panel, are set to both left and right sides of the external panel at the lowermost end of the external panel.

\* \* \* \* \*